US008858864B2

(12) United States Patent
Okesaku et al.

(10) Patent No.: US 8,858,864 B2
(45) Date of Patent: Oct. 14, 2014

(54) NOZZLE MEMBER AND PROCESS FOR PRODUCING THE SAME

(75) Inventors: Masahiro Okesaku, Komatsu (JP); Michito Miyahara, Chikushi-gun (JP)

(73) Assignees: Tokyo Electron Limited (JP); Hokuriku Seikei Industrial Co., Ltd. (JP)

( * ) Notice: Subject to any disclaimer, the term of this patent is extended or adjusted under 35 U.S.C. 154(b) by 720 days.

(21) Appl. No.: 12/671,431

(22) PCT Filed: Jul. 30, 2008

(86) PCT No.: PCT/JP2008/063627
§ 371 (c)(1),
(2), (4) Date: Apr. 13, 2010

(87) PCT Pub. No.: WO2009/017141
PCT Pub. Date: Feb. 5, 2009

(65) Prior Publication Data
US 2010/0243764 A1    Sep. 30, 2010

(30) Foreign Application Priority Data

Jul. 31, 2007 (JP) ................................. 2007-199391

(51) Int. Cl.
*C04B 35/64* (2006.01)
*B28B 21/52* (2006.01)
(Continued)

(52) U.S. Cl.
CPC ............. *B28B 3/2645* (2013.01); *C04B 35/185* (2013.01); *B28B 21/52* (2013.01); *C04B 2235/77* (2013.01); *D01D 4/025* (2013.01);
(Continued)

(58) Field of Classification Search
USPC .................................................... 264/44, 610
See application file for complete search history.

(56) References Cited

U.S. PATENT DOCUMENTS 3,109,797 A * 11/1963 Maxwell .................... 376/435
3,751,271 A *  8/1973 Kimura et al. ............... 501/85
(Continued)

FOREIGN PATENT DOCUMENTS

EP    248560 A1 * 12/1987
JP    02274505 A * 11/1990
(Continued)

OTHER PUBLICATIONS

"extract" definition (Merriam-Webster online dictionary) Feb. 2013.*
(Continued)

*Primary Examiner* — Matthew Daniels
*Assistant Examiner* — Lisa Herring
(74) *Attorney, Agent, or Firm* — Cantor Colburn LLP

(57) ABSTRACT

The nozzle member of a fluid nozzle includes at least one through hole that is parallel to a center axis, wherein a diameter dimension of the through hole is 10 μm to 100 μm, a length-to-diameter ratio (L/D) of the through hole is 5 or above, and the nozzle member is formed of ceramics having relative density of 95% or above. The nozzle member including a plurality of minute through holes is manufactured by performing extrusion or cast molding in such a way that a molded body includes a filament of synthetic resin, carbon, or metal in a direction of the center axis of the molded body, and then defatting/sintering the molded body after removing the filament or, when the filament is formed of synthetic resin or carbon, defatting/sintering the molded body under oxidizing atmosphere to evaporate and remove the filament without removing the filament from the molded body.

2 Claims, 7 Drawing Sheets

(51) Int. Cl.
- *B28B 3/26* (2006.01)
- *D01D 4/02* (2006.01)
- *B28B 7/34* (2006.01)
- *B28B 7/18* (2006.01)
- *C04B 35/76* (2006.01)
- *C04B 35/185* (2006.01)
- *C04B 35/111* (2006.01)
- *C04B 35/119* (2006.01)

(52) U.S. Cl.
CPC ........... *C04B 35/111* (2013.01); *C04B 2235/96* (2013.01); *B28B 7/342* (2013.01); *C04B 2235/3225* (2013.01); *C04B 2235/3246* (2013.01); *C04B 35/116* (2013.01); *C04B 2235/5445* (2013.01); *C04B 2235/3206* (2013.01); *C04B 2235/6021* (2013.01); *C04B 2235/6027* (2013.01); *B28B 7/18* (2013.01); *C04B 35/76* (2013.01)
USPC ........... 264/629; 264/634; 264/638; 264/660; 264/678; 264/148

(56) References Cited

U.S. PATENT DOCUMENTS

| | | | | |
|---|---|---|---|---|
| 5,143,668 | A * | 9/1992 | Hida | ............................. 264/649 |
| 5,308,556 | A * | 5/1994 | Bagley | ............................ 264/13 |
| 6,579,394 | B1 * | 6/2003 | Nakamura et al. | .......... 156/89.12 |
| 6,680,268 | B2 * | 1/2004 | Alford et al. | ................... 501/127 |
| 7,169,198 | B2 * | 1/2007 | Moeltgen et al. | ............... 51/293 |

FOREIGN PATENT DOCUMENTS

| | | |
|---|---|---|
| JP | 05-132374 | 5/1993 |
| JP | 06-143073 | 5/1994 |
| JP | 10-088416 | 4/1998 |
| JP | 2001-003221 | 1/2001 |
| JP | 2003-181326 | 7/2003 |
| JP | 2007-051015 | 3/2007 |

OTHER PUBLICATIONS

English translation of JP02-274505 Performed McElroy Translations, Sep. 2012.*

Draeger et al., "Engineering the surface texture and shape of channels in ceramic substrates", Mat. Sci. and Eng. B97 (2003), pp. 94-105.*

Taiwanese Office Action—Taiwanese Application No. 097129103 issued on Sep. 23, 2011, citing JP 2007-51015.

International Search Report—PCT/JP2008/063627 dated Oct. 21, 2008.

Korean Office Action—Korean Application No. 10-2010-7002338 issued on Oct. 24, 2011, citing JP 05-132374 and JP 2001-003221.

* cited by examiner

NOZZLE MEMBER AND PROCESS FOR PRODUCING THE SAME

TECHNICAL FIELD

The present invention relates to a nozzle member of a fluid nozzle used to discharge, eject or vacuum-absorb a fluid, such as gas or liquid, and a method of producing the nozzle member.

BACKGROUND ART

In general, a nozzle member is used as a nozzle for discharging or ejecting a fluid, such as gas or liquid, from a plurality of discharge holes. In order to uniformly discharge or eject the fluid, a tolerance of a diameter dimension of a through hole constituting a fluid path of a nozzle member may be as small as possible, the through hole may be highly precisely formed, and roughness of an inner wall surface of the is through hole may be low.

The through hole of the nozzle member may be a minute hole having a small diameter dimension, and the plurality of through holes may be formed in a direction of the center axis of the nozzle member.

For example, according to Japanese Laid-Open Patent Publication No. hei 10-88416 (hereinafter, referred to as Reference Document 1), a nozzle piece including a plurality of discharge holes is installed to a nozzle body so as to increase the number of discharge holes of the nozzle body. Also, Reference Document 1 discloses a spinning nozzle to relatively reduce the number of nozzle pieces with respect to the number of discharge holes of the nozzle body.

Also, Japanese Laid-Open Patent Publication No. 2001-3221 (hereinafter, referred to as Reference Document 2) discloses a spinning nozzle (mouth piece) including a discharge hole having a diameter dimension of 0.2 mm, and an inner wall surface roughness of 1 S or lower.

The discharge hole of the spinning nozzle generally has a small diameter of about 0.2 mm, and is preferable to have an inner wall surface having a low roughness. Accordingly, the discharge hole is formed via a laser processing or precise processing, and then the inner wall surface of the discharge hole is polished.

The plurality of (tens of) discharge holes are required to be formed in the spinning nozzle. However, when the discharge holes are directly formed in a nozzle body, the spinning nozzle is considered to be defective if just one discharge hole is defective. Thus, material costs and huge resources spent on the spinning nozzle are wasted. Accordingly, in order to reduce such wasted manufacturing costs, Reference Document 1 discloses a method of manufacturing the spinning nozzle by separately manufacturing a nozzle member (the nozzle piece) including at least one discharge hole via an injection molding method, or the like, and then installing and fixing the nozzle member to an installation hole (through hole) pre-formed in the nozzle body, as disclosed in Reference Document 1.

When this method is used, the manufacturing costs are reduced when the number of discharge holes is relatively larger than the number of nozzle members, and moreover, spinning efficiency is increased as the number of discharge holes is increased. Accordingly, the number of discharge holes formed in the nozzle members may be preferably as many as possible, and the spinning nozzle is suitable for manufacturing a microfiber when the discharge holes have a small diameter dimension.

The inner wall surface of the discharge hole largely affects flow resistance of melted resin, and is related to the quality of a spun thread, and thus may have a roughness of 1 S or lower.

However, when a nozzle member including a plurality of through holes (minute holes) is manufactured by using an injection molding method or an extrusion molding method, wherein the injection molding or extrusion molding method is largely used as a simple and optimum method for forming a minute path including a discharge hole for a fluid, and a diameter of a through hole-forming pin (round rod) used in a mold is 0.2 mm (200 μm) or lower, or 0.1 mm (100 μm) or lower, the through hole-forming pin may be damaged by being bent or broken. Accordingly, the through holes may be difficult to be manufactured.

Meanwhile, as an ideal nozzle characteristic, a fluid needs to be straightly discharged in a laminar flow when the fluid is discharged from a through hole of a nozzle member, because a problem may occur when the fluid is turbulently discharged. The through hole of the nozzle member suitable for discharging the fluid in the laminar flow requires a large length-to-diameter ratio (L/D), i.e., an aspect ratio, wherein the aspect ratio may be 5 or above, in detail, 20 or above. Moreover, when the roughness of the inner wall surface of the through hole is low, the flow resistance of the fluid is small, and thus a turbulent discharge of the fluid may not occur.

However, when an injection molding method or an extrusion molding method is used to form a through hole having a diameter of 200 μm or less, in detail, 100 μm or less, and an aspect ratio of 5 or above, a through hole-forming pin used in a mold may be deformed or damaged. Also, when a laser processing method is used, it is difficult to make a diameter of the through hole identical along the overall length of the through hole, and to polish the inner wall surface of the through hole. Alternatively, when the through hole is formed by using a tool, such as a micro drill, the rigidity of the tool is decreased below a through hole-forming resistance, as the diameter of the tool is decreased. Accordingly, the tool may often be deformed or damaged, and thus it is difficult to form the through hole. Moreover, when the diameter of the through hole is 100 μm or less, it is very difficult to form the through is hole by using the tool. Also, in the injection molding method, about 20% of thermal plastic resin is mixed with ceramic powder, and thus a dense sintered body having a high relative density cannot be obtained.

As described above, a conventional nozzle member including a through hole, which has a diameter of 100 μm or lower and an aspect ratio of 5 or above, is very difficult to be manufactured, and a through hole constituting a minute hole having a diameter of 50 μm or lower and an aspect ratio of 5 or above cannot be manufactured. In other words, it is difficult to decrease the diameter of the through hole of the conventional nozzle member, and the use of a nozzle including the conventional nozzle member is limited, and thus the nozzle cannot perform various high-quality operations.

A vacuum suction plate that is generally used when manufacturing a semiconductor may generally include, aside from a suction plate for polishing, a porous material including ceramics or other hard materials, as disclosed in Japanese Laid-Open Patent Publication No. hei 6-143073 (hereinafter, referred to as Reference Document 3). However, the vacuum suction plate including the porous material is manufactured by molding raw material powder, such as ceramics, into a plate shape, and then sintering the raw material powder, and thus the porosity of the entire surface of the vacuum suction plate may not be uniform, and pore diameters on a surface contacting the semiconductor may vary. Accordingly, suction power of the vacuum suction plate may vary according to each pore diameter, and thus a very thin semiconductor may be dented due to the suction power in a portion where a pore diameter is relatively large. Also, since the strength of the porous material is low, a particle of the porous material may be worn out or damaged, thereby leaving flaws on the semiconductor.

Also, since the vacuum suction plate formed of the porous material generally has a maximum pore diameter of hundreds of micrometers, and moreover, has a very large aeration rate, when a semiconductor smaller than a diameter of a suction surface of the vacuum suction plate is suctioned and moved, vacuum suction power is used for an area other than a surface contacting a relatively small semiconductor, and thus semiconductors in different sizes cannot be uniformly suctioned. Accordingly, the vacuum suction plate of Reference Document 3 requires a sealing unit for blocking suction air by impregnating resin in a suction hole according to is various concentric rings having different dimensions.

When a nozzle member including a minute and long through hole having a diameter of 100 μm or lower and an aspect ratio of 5 or above according to the present invention is applied to the vacuum suction plate, stable suction power based on stable fluid flow is obtained, and thus the problems described above may be resolved. Also, when gas including various components is discharged, fluid resistance in the minute and long through hole is low, and thus energy may be saved by reducing the pressure for supplying the gas.

DISCLOSURE OF THE INVENTION

Technical Problem

To solve the above and/or other problems, the present invention provides a nozzle member for obtaining stable flow of fluid and performing a high-quality operation.

To solve the above and/or other problems, the present invention also provides a nozzle member including a minute and long through hole, and a method of manufacturing the nozzle member.

Technical Solution

According to an aspect of the present invention, a nozzle member of a fluid nozzle includes at least one through hole that is parallel to a center axis, wherein a diameter dimension of the through hole is from 10 μm to 100 μm, a length-to-diameter ratio (L/D) of the through hole is 5 or above, and the nozzle member is formed of ceramics having a relative density of 95% or above.

By setting the diameter dimension of the through hole to be from 10 μm to 100 μm, and the length-to-diameter ratio (L/D), i.e., an aspect ratio, to be 5 or above, a fluid stably flows, and thus the nozzle member may perform a high-quality operation for spinning, for vacuum suctioning in vacuum suction plate, for discharging gas, or for other purposes.

Vickers hardness (Hv) of the ceramics may be 1000 or above.

The ceramics may be alumina-based ceramics, wherein 1 mass % or less of $Al_2O_3$ having 99.5% purity or above is substituted by at least one of a particle growth inhibitor, such as MgO, $TiO_2$, $SiO_2$, $Cr_2O_3$, $Y_2O_3$, $Ce_2O_3$, or $Dy_2O_3$, and a sintering is accelerator, or mullite-based ceramics, a compound of $Al_2O_3$ and $Y_2O_3$, ceramics having 99% or more $Y_2O_3$, or $ZrO_2$-based ceramics, wherein the amount of contained impurities is 0.5 mass % or less. Alternatively, ceramics in which 5 mass % or less of $Al_2O_3$ having 99.5% purity or above is substituted by $ZrO_2$ may be used.

According to another aspect of the present invention, a method of manufacturing the nozzle member includes: preparing a mixture by mixing raw material powder of ceramics, a binder for extrusion molding, and moisture; inserting and passing a filament formed of synthetic resin or carbon into and through a mold for extrusion molding, wherein the mold includes a filament guide and an orifice; preparing an extrusion-molded body including the filament in a direction of a center axis by supplying the mixture into the mold with pressure; preparing a green body by cutting and drying the extrusion-molded body in a predetermined length; and forming a through hole parallel to the center axis by evaporating and removing the filament while defatting and sintering the green body by plasticizing the green body.

According to another aspect of the present invention, an extrusion-molded body including a filament formed of synthetic resin, carbon, or a metal is prepared according to the same manner as described above, a green body for a nozzle member is prepared by cutting a dried body of the extrusion-molded body in a predetermined length while extracting and removing the filament, and then forming a through hole parallel to a center axis of the green body is formed by defatting and sintering the green body.

According to another aspect of the present invention, a method of manufacturing a nozzle member includes: preparing a slurry in which raw material powder of ceramics, water, and binder are mixed and dispersed; disposing a filament formed of synthetic resin, carbon, or a metal in a direction of a center axis inside a casting space of a mold for cast molding, wherein the mold is formed of plaster or porous material; and preparing a cast molded body including the filament by injecting the slurry into the mold. When the filament is a metal wire, the metal wire may be extracted from the cast molded body, and then the cast molded body may be dried, defatted, and sintered so as to form a through hole parallel to the center axis. Alternatively, when the filament is formed of synthetic resin or carbon, the cast molded body including the filament may be dried, defatted, and sintered so as to evaporate and remove the filament, thereby forming a through hole parallel to the center axis. Alternatively, even when the filament is formed of synthetic resin or carbon, the filament may be extracted from the cast molded body like the metal wire, and then a through hole parallel to the center axis may be formed by drying, defatting, and sintering the cast molded body.

Advantageous Effects

Since a diameter dimension of a through hole may be set from 10 μm to 100 μm, and a length (L) to diameter (D) ratio (L/D), i.e., an aspect ratio, of the through hole may be large, such as 5 or above, as the occasion commands, fluid stably flows in a laminar flow without turbulence, and thus a nozzle member has excellent performance for spinning, for a vacuum suction plate, for discharging or ejecting gas or liquid, and for other purposes.

According to a method of manufacturing a nozzle member of the present invention, the nozzle member including one or more minute and long through holes having a diameter dimension of 100 μm or lower and an aspect ratio of 5 or above, which is difficult to be manufactured by using a conventional method, may be manufactured by using an extrusion molding method or a cast molding method.

Since an inner wall surface of a through hole of a nozzle member manufactured by using a method of the present invention has a roughness of 1 S or lower, in detail, 0.5 S or lower, after being sintered, the inner wall surface may not be polished, and thus manufacturing costs of the nozzle member may be remarkably reduced.

By using a filament having a uniform diameter, a diameter dimension of each through hole may be formed highly precisely and uniformly. Accordingly, an discharging or absorbing amount of gas or liquid is identically controlled for all through holes.

Since the inner wall surface of a through hole is densely formed and has excellent roughness, pressure loss due to fluid resistance accompanied to the flow of gas or liquid is small. Accordingly, energy may be saved because pressure used to flow the gas or liquid may be reduced.

BRIEF DESCRIPTION OF THE DRAWINGS

The above and other features and advantages of the present invention will become more apparent by describing in detail exemplary embodiments thereof with reference to the attached drawings in which:

FIGS. 2A and 2B illustrate a nozzle member according to an embodiment of the present invention, wherein FIG. 2A is a plan view of the nozzle member, and FIG. 2B is a cross-sectional view taken along a line A-A of FIG. 2A;

FIG. 4 illustrates a filament guide of FIG. 3, according to an embodiment of the present invention, wherein

BEST MODE FOR CARRYING OUT THE INVENTION

Figure 1:
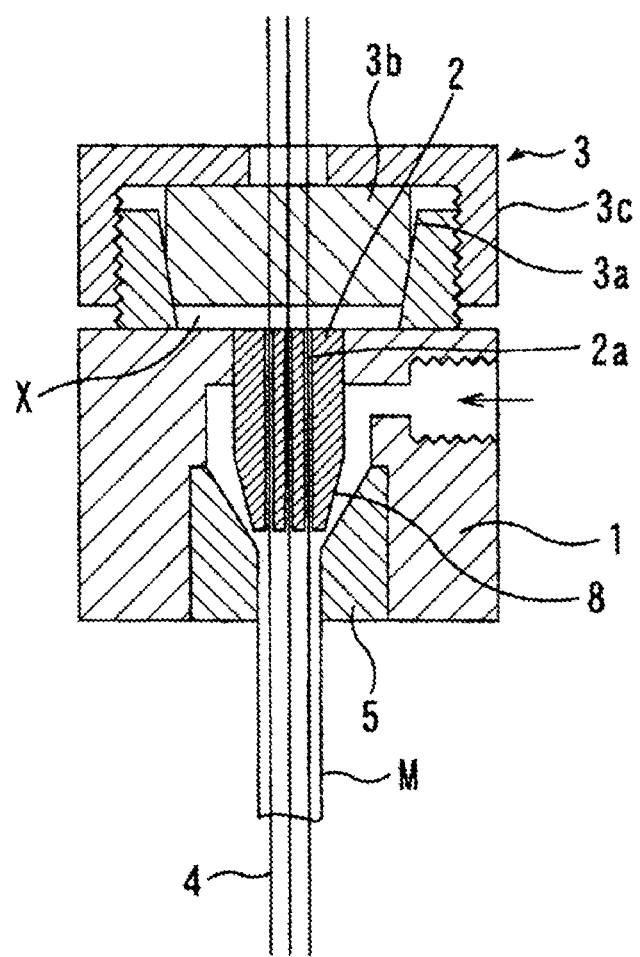
FIG. 1 illustrates a mold for extrusion molding used to manufacture a nozzle member, according to an embodiment of the present invention.

Hereinafter, the present invention will be described in detail by explaining exemplary embodiments of the invention with reference to the attached drawings. Like reference numerals in the drawings denote like elements.

Example 1

First, a mixture is prepared by mixing 6 parts by mass of a binder for extrusion molding and 100 parts by mass of a raw material of ceramics for forming a nozzle member of a fluid nozzle in a mixer, and gradually adding a predetermined amount of water to the mixer, wherein the ceramics are alumina-based ceramics in which 0.4 mass % and 0.1 mass % of $Al_2O_3$ having 99.9% purity or above and an average particle size of 0.6 μm are respectively substituted by MgO and $Y_2O_3$, which are highly pure and fine powder particles.

Meanwhile, seven guide holes 2a formed in a filament guide 2 installed at the center axis of a nozzle body 1 of a mold for extrusion molding illustrated in FIG. 1 are formed to have a dimensional tolerance within ±1 μm. A filament 4 formed of synthetic resin and having a diameter of 70 μm is drawn from a filament supplier 3 having a back-tension function. The filament 4 is inserted into and passed through each of the guide holes 2a. The filament 4 passes through an orifice 5 disposed at a lower portion of the nozzle body 1 and pulled with a tension, thereby preparing the mold to perform extrusion molding.

Also, in the filament supplier 3 having a back-tension function, an elastic body 3b including a plurality of narrow holes is set on a recessed unit 3a having a tapered shape and integrally formed at a top of the nozzle body 1. After the filament 4 is inserted into and passed through the narrow holes of the elastic body 3b formed of neopropylene rubber, by using a vacuum gun, wherein each narrow hole corresponds to a through hole of the nozzle member, the elastic body 3b is tightened in a direction where a tightening seam width X is 0 by using a tightening cap 3c. Accordingly, the narrow holes of the elastic body 3b are reduced in size thereof, thereby tightening the filament 4, and thus the strength of the back-tension function may be controlled to the optimum condition. Also, since the filament 4 proceeds toward the orifice 5 in the filament guide 2, the mixture put into the mold for extrusion molding is prevented from flowing into the guide hole 2a.

Then, the mixture is supplied with high pressure from a cylinder (not shown) to the mold in a direction indicated by an arrow so that the mixture and the filament 4 are extruded in a round rod shape from the orifice 5, thereby obtaining an extrusion-molded body M including the filament 4. Alternatively, the mold may not include the filament supplier 3 having the back-tension function, and instead, each filament 4 may pass through a roller (a tension roller) having a rotational torque so as to perform the same extrusion molding as the filament supplier 3.

A green body of the nozzle member is prepared by cutting the extrusion-molded body M in a predetermined length and drying the cut extrusion-molded body M. The green body is defatted while evaporating and removing most of the filaments 4 from the green body by slowly increasing the temperature of the green body up to 600° C. under a natural atmosphere. Then, the filament is completely removed by sintering the green body at a temperature of 1500° C. By processing the green body, from which the filaments 4 are removed, in is a predetermined length, a nozzle member 6 having an outer diameter of 1.5 mm and a through hole 6a is manufactured as shown in FIG. 2, wherein the through hole 6a has a diameter dimension of 50 μm, the roughness of an inner wall surface of the through hole 6a is 0.8 S or lower, the specific gravity of the nozzle member 6 is 3.92, and Vickers hardness (Hv) of the nozzle member 6 is 1750.

In the current embodiment, a solid synthetic fiber is used as the filament 4, but the filament 4 may be hollow having a hole in a length direction. By using the hollow filament 4, the through hole 6a may not crack or the like when the synthetic resin thermally expands or rapidly evaporates during defatting and sintering. Alternatively, when the filament 4 is formed of carbon instead of synthetic resin, the through hole 6a may not crack when the filament 4 thermally expands during defatting and sintering, because the carbon has a small thermal expansion coefficient. Alternatively, the extrusion-molded body M may be defatted and sintered after removing the filament 4 from the extrusion-molded body M.

Figure 3:
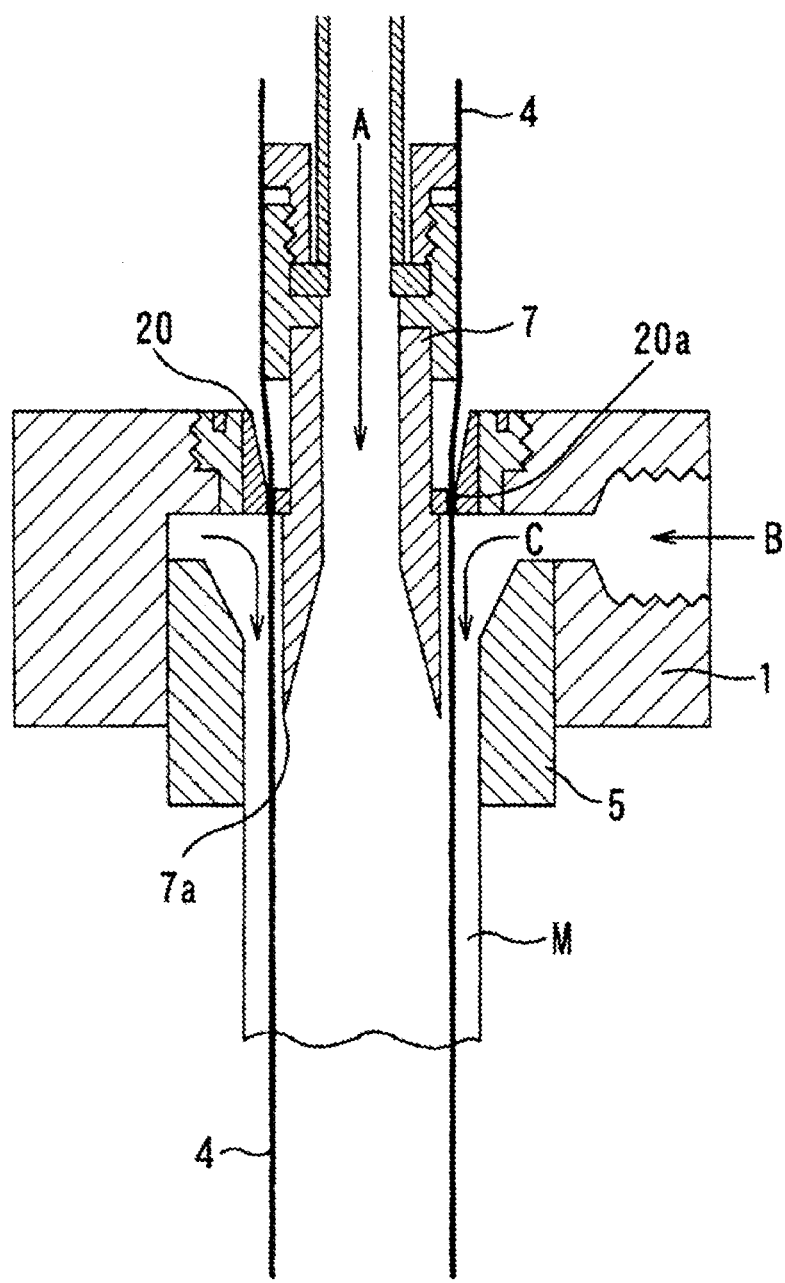
FIG. 3 illustrates a mold for extrusion molding, according to another embodiment of the present invention.

A mold for extrusion molding illustrated in FIG. 3 may be used. In the mold, a filament guide 20 having a ring shape as shown in FIG. 4 is provided on the outer periphery of a needle 7 constituting a path for pushing the mixture at the center axis of the nozzle body 1 in a direction indicated by an arrow A. The filament 4 formed of hollow synthetic resin is inserted into and passed through each of thirty guide holes 20a formed in a concentric ring of the filament guide 20, and the mixture is supplied with pressure from a high pressure cylinder (not shown) in directions indicated by arrows A and B, while the filaments 4 are pulled. Accordingly, the mixtures proceed straight inside the needle 7, and also enter between the orifice 5 and the outer periphery of the needle 7 in a direction indicated by a curved arrow C. The mixtures supplied from different directions meet at a tip 7a of the needle 7, thereby forming a round rod, and thus the extrusion-molded body M including the filaments 4 is prepared.

Regarding the amount of the mixtures supplied in the directions indicated by arrows A and B, the extrusion-molded body M formed inside and outside the tip 7a of the needle 7 may be homogeneous by equating the volumes per unit hour of the mixtures passing through the inside and outside of the tip 7a of the needle 7. Also, the filaments 4 may have a back-tension function by disposing a tension roller (not shown) at the back of the upper periphery of the needle 7.

Figure 4A:
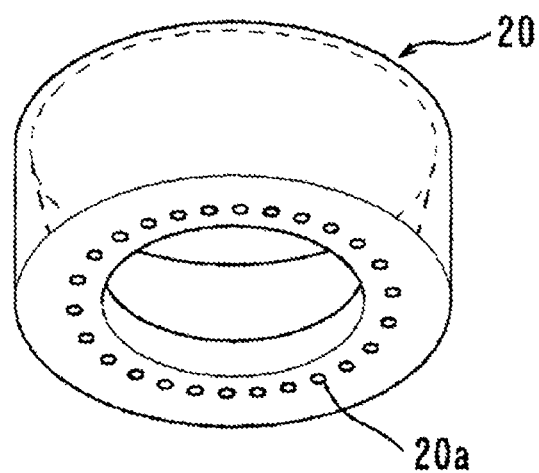
FIG. 4A is a perspective view of the filament guide.
Figure 4B:
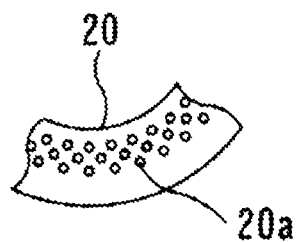
FIG. 4B is a cross-sectional view of the filament guide.

The guide holes 20a formed in the filament guide 20 may be arranged in a row as shown in FIG. 4A, or alternatively, may be arranged in a plurality of rows as shown in FIG. 4B by increasing the outer diameter of the extrusion-molded body M to be larger than about 5 mm so as to manufacture the nozzle member including 100 or more through holes.

Example 2

Mullite-based ceramic powder is prepared as a raw material of ceramics for forming the nozzle member, by performing a co-precipitation method on a mixed solution of an aluminum chloride solution and an ethyl silicate solution, in which $Al_2O_3$ is from 65 to 75 mass % and $SiO_2$ is from 25 to 35 mass %.

Alternatively, a compound of $Al_2O_3$ and $Y_2O_3$ is prepared as the raw material of ceramics, by mixing 99 mass % of $Al_2O_3$ powder having 99.5% purity and an average particle size of 0.8 µm and 1 mass % of $Y_2O_3$ powder having 99.9% purity and an average particle size of 0.6 µm and 0.3 µm.

Alternatively, mixed powder is prepared as the raw material of ceramics, by substituting 5 mass % and 3 mass % of $Al_2O_3$ powder having 99.5% purity and an average particle size of 0.4 µm by $ZrO_2$ powder partially stabilized with 2.5 mol % of $Y_2O_3$.

Alternatively, $ZrO_2$-based ceramic powder is prepared as the raw material of ceramics, by preparing $ZrO_2$ powder partially stabilized with 2.5 mol % of $Y_2O_3$ and having 99.5% purity and an average particle size of 0.3 µm, or by mixing 75 mass % or above of such $ZrO_2$ powder and 25 mass % or less of $Al_2O_3$ used in Example 1.

The nozzle members are manufactured in the same manner as in Example 1, by using the mullite-based ceramic powder, the compound of $Al_2O_3$ and $Y_2O_3$, the mixed powder, and the $ZrO_2$-based ceramic powder. The nozzle members manufactured accordingly have a relative density of 95% or above, Hv of 1000 or above, and a roughness of an inner wall surface of a through hole of 1 S or lower, regardless of the raw material of ceramics.

Example 3

A slurry is prepared by pulverizing and mixing 100 parts by mass of $Al_2O_3$ powder having 99.99% purity or above and an average particle size of 0.5 µm, 100 L of water, 4 parts by mass of an emulsion type wax-based binder in solid content, 0.5 parts by mass of antifoaming agent, and 0.5 parts by mass of deflocculant by using is a ball mill.

Figure 5:
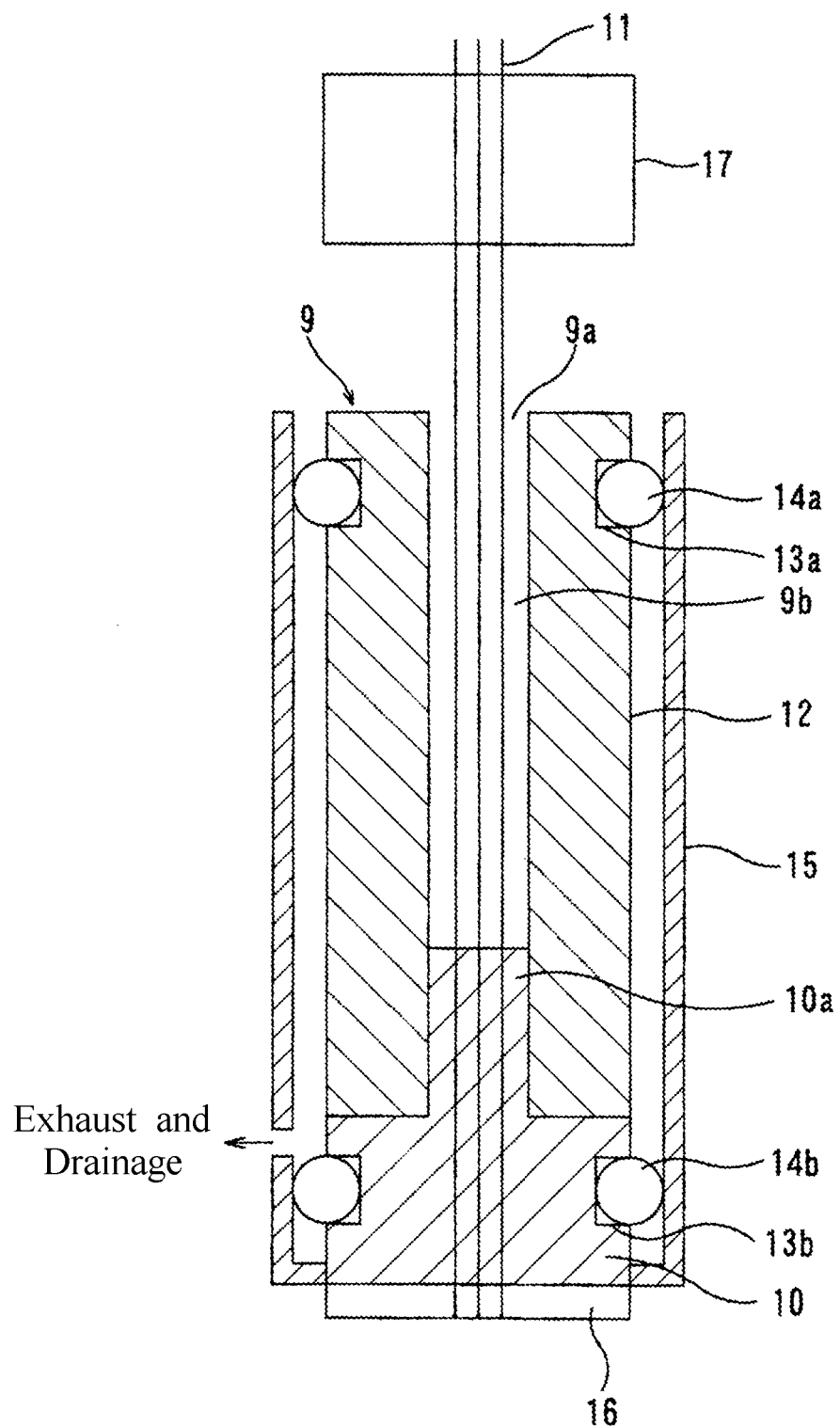
FIG. 5 illustrates a mold for cast molding used to manufacture a nozzle member, according to an embodiment of the present invention.

In order to manufacture a nozzle member from the slurry via cast molding, a mold 9 for cast molding, formed of a porous resin as illustrated in FIG. 5 is used. According to the mold 9, a filament 11 formed of synthetic resin, carbon, a metal, or the like and having a diameter of 100 µm is inserted into and passed through each of seven narrow holes formed in a lower plate member 10 of the mold 9 without a gap, the filament 11 is disposed in a direction of an center axis of the mold 9, an absorption container 12 that is divided into halves is attached around a protruding portion 10a of the lower plate member 10, as a porous resin mold, without a gap, and the absorption container 12 is installed inside a vacuum suction container 15 by attaching O-rings 14a and 14b to top and bottom O-ring grooves 13a and 13b, respectively. Accordingly, moisture in the slurry is absorbed and sucked by the absorption container 12 disposed between the O-rings 14a and 14b. A bottom portion of the filament 11 is fixed to a filament fixing plate 16 disposed below the lower plate member 10 and formed of a material other than a porous material.

A top portion of the filament 11 disposed in the direction of the center axis of the mold 9 is fixed to a tension guide 17 with a little tension. Then, the slurry prepared as above is poured into a slurry casting space 9b, i.e., into the absorption container 12, through a slurry inlet 9a of the mold 9, and then the vacuum suction container 15 is vacuum-exhausted. By vacuum-exhausting the vacuum suction container 15, the moisture in the slurry is absorbed and sucked. Since the surface of the slurry goes down as the moisture is absorbed and sucked, the moisture is sufficiently absorbed and sucked by stopping the slurry for a predetermined time after supplying the slurry into the absorption container 12.

Next, when the filament 11 formed of a metal, such as a metal wire, is used, the metal wire is extracted with the filament fixing plate 16, in parallel to the direction of the center axis of the mold 9, the entire unit inside the vacuum suction container 15 is taken out, and then a cast molded body is obtained by removing the absorption container 12. A nozzle member having a length of 15 mm, an outer diameter of 1.2 mm, and seven through holes, is manufactured by drying, defatting, and sintering the cast molded body, and then cutting the cast molded body. Here, a diameter of a through hole is 80 µm, roughness of an inner wall surface of the through hole that is parallel to the center axis is 1 S or lower, the specific gravity of the nozzle member is 3.95 (the relative density is 99.1%), and Vickers hardness Hv of the nozzle member is 1800.

An excellent through hole may be formed by using a metal wire, which has high tensile strength and is formed of tungsten or molybdenum, as the filament 11, aside from a leader of a fishing line for sweetfish fishing formed of synthetic resin or a piano wire. Here, when the metal wire is used as the filament 11, a piano wire coated with an oil film, a release agent, or Tefron (registered trademark) may be used so that the filament 11 is easily extracted.

In addition, when the filament 11 is formed of synthetic resin or carbon, the filament 11 may be evaporated and removed by defatting and sintering the cast molded body, as in the previous embodiment.

When the slurry is cast molded by using a conventional plaster mold that is generally used instead of the mold for cast molding formed of a porous resin, the O-rings 14a and 14b and the vacuum suction container 15 are not required because the lower plate member 10 and the absorption container 12 that is thick are formed by using plaster, and the absorption container 12 absorbs the moisture of the slurry. However, other elements and configuration of the conventional plaster mold are identical to those of the mold formed of the porous resin, and the cast molding may be performed in the same manner as in the mold formed of the porous resin.

Example 4

As raw materials of ceramics for forming the nozzle member, the mullite-based ceramic powder, the compound of $Al_2O_3$ and $Y_2O_3$, the $ZrO_2$ powder partially stabilized with $Y_2O_3$ mixed powder, and the $ZrO_2$-based ceramic powder where $Al_2O_3$ is substituted for a part of $ZrO_2$ used in Example 2 are used.

A slurry for cast molding is prepared by mixing a suitable amount of water, an emulsion type wax-based binder, an antifoaming agent, and a disperser or deflocculant with each raw material of ceramics, as in Example 3, and then cast molding, sintering, and other operations are performed as in Example 3, thereby manufacturing a nozzle member formed of various ceramics, wherein roughness of an inner wall surface of a through hole is 1 S or lower, relative density is 95% or above, and Hv is 1000 or above, wherein the Hv of the $ZrO_2$ powder partially stabilized with 2.5 mol % of $Y_2O_3$ is the lowest, at 1050.

Figure 2A:
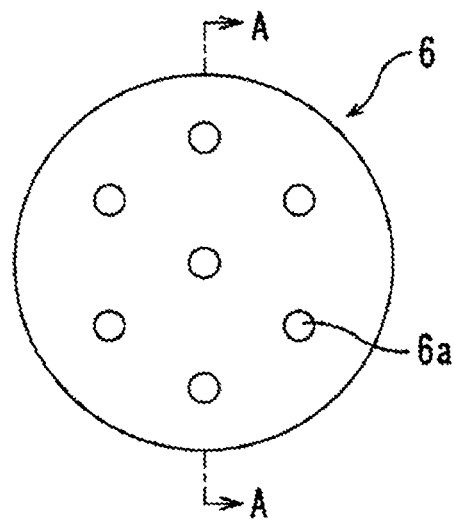
Figure 2B:
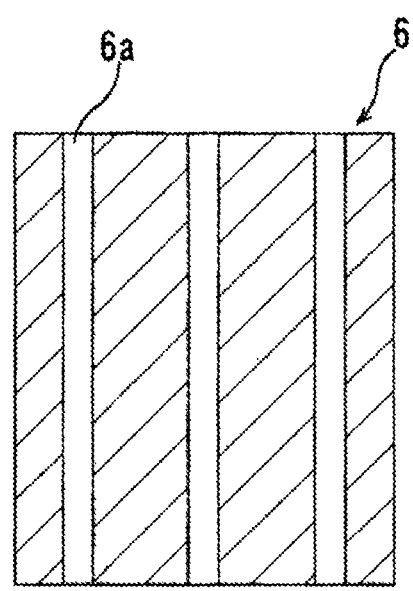
Figure 6:
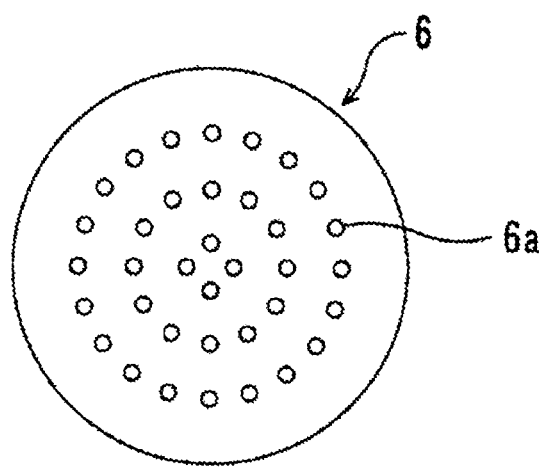
FIG. 6 is a plan view of a nozzle member according to another embodiment of the present invention.

According to Examples 1 through 4, the nozzle member 6 illustrated in FIGS. 2A and 2B, which is formed of ceramics, has seven (at least one) through holes 6a, and has an aspect ratio of 5 or above, is manufactured, and moreover, the nozzle member 6 illustrated in FIG. 6, which includes at least 36 through holes 6a may be manufactured. Also, since a very long molded body is obtained by using an extrusion molding method, the very long molded body may be cut to a desired length in the state of green body or sintered body.

Figure 7A:
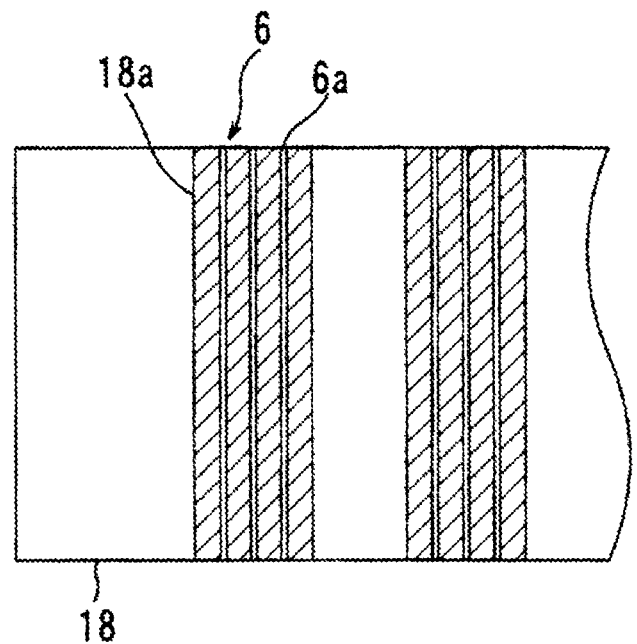
FIGS. 7A and 7B illustrate the configurations of a fluid nozzle using a nozzle member, according to embodiments of the present invention.
Figure 7B:
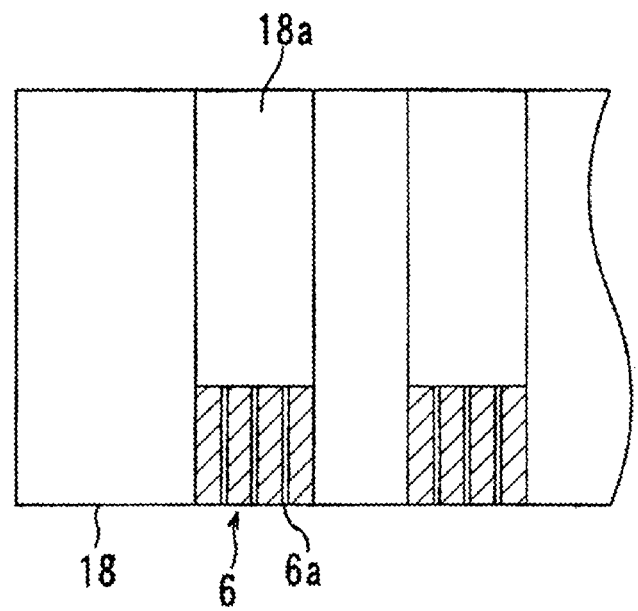

The nozzle member 6 may be installed to a nozzle member installation hole 18a formed in a nozzle body 18 in a thickness direction of the nozzle body 18 along the full length of the nozzle body 18 as shown in FIG. 7A, at an end surface of top or bottom of the nozzle member installation hole 18a as shown in FIG. 7B, or in a location away from the end surface, so as to use the nozzle member 6 for a fluid discharging nozzle or a vacuum suction plate by using the nozzle member 6 for a vacuum suction nozzle.

In a conventional fluid discharging nozzle, a fluid is discharged only from a single through hole. However, in the nozzle member of the present invention, fluid may be distributed through a plurality of through holes. Accordingly, fluid can be discharged in a wide range by reducing the flow rate of the fluid. Also, according to the present invention, since a plurality of minute through holes are easily formed in one nozzle member, the number of through holes may be increased several times as compared to through holes of a conventional nozzle member, while distributing the plurality of through holes on the entire surface of a nozzle body.

Here, if the hardness of ceramics for forming a nozzle member is low, the spinning quality of a spinning mouth piece may be decreased, suction may be weak or not uniform due to abrasion of a suction surface of a vacuum suction plate, and moreover, when minute through holes are worn out, the amount of fluid passing through the minute through holes may not be uniform.

Abrasion resistance of the nozzle member is very important, and thus the Vickers hardness Hv of a material for forming the nozzle member needs to be 1000 or above. The hardness of the nozzle member is related to the relative density of the material, and thus if the relative density is less than 95%, the hardness may be decreased due to low density of the material, and the fluid resistance may be increased due to deterioration of roughness on the inner wall surface of the through hole.

Also, the purity of ceramics for forming a nozzle member may be as high as possible, considering that a fluid nozzle is exposed to various fluids or atmospheres, and the amount of impurities penetrated into fluid, such as acid, alkali, or corrosive gas, may be 1 mass % or less, preferably 0.5 mass %, and more preferably 0.1 mass %. Also, a component aside from MgO substituting a part of $Al_2O_3$ may have an average particle size of 1 μm or less, and preferably 0.5 μm or less. When the size of the component is small, the component has the same effect as MgO or $Y_2O_3$ through a small amount of substitution.

In addition, a nozzle member of the present invention may be installed to a nozzle body through a shrink fit or integral sintering process. In the integral sintering process, the nozzle member is inserted into an installation hole formed in a powder molded body, a defatted body, or temporarily-sintered body of the nozzle body formed of the same type of ceramics as the nozzle member or different type of ceramics from the nozzle member, and then the nozzle member is integrally sintered to the nozzle body. Here, the installation hole formed in the nozzle body may have a size that presses the nozzle member as the nozzle body is sintered and contracted.

Ceramics for forming a nozzle member, according to the present invention, may be non-oxide-based ceramics, such as carbide, nitride, or boride, or a compound of oxide-based or non-oxide-based ceramics, aside from oxide-based ceramics. Then, the nozzle member may be manufactured by selecting a solvent or binder that is suitable to be mixed with such various ceramics, and by employing a non-oxidizing atmosphere as an internal furnace atmosphere of a defatting or sintering furnace. Here, when the non-oxide-based ceramics is used, a filament used during extrusion molding or cast molding is required to be extracted so that the filament formed of synthetic resin or carbon does not remain as a carbide, because the internal furnace atmosphere is a non-oxidizing atmosphere.

Also, the surface roughness of a filament formed of a material aside from synthetic resin, carbon, or a piano wire is mostly 0.5 S or lower, and by using such filament, the roughness of an inner wall surface of a through hole may be 0.4 S, in detail, 0.3 S or lower.

INDUSTRIAL APPLICABILITY

The present invention may be applied to nozzle members for a fluid discharging nozzle such as a spinning nozzle, a vacuum absorbing nozzle, and other fluid nozzles.

EXPLANATION OF REFERENCE NUMERALS

1: Nozzle Body
2, 20: Filament Guide
2a, 20a: Guide Hole
3: Filament Supplier
3a: Recessed Unit
3b: Elastic Body
3c: Tightening Cap
4: Filament
5: Orifice
6: Nozzle Member
6a: Through Hole
7: Needle
7a: Tip of Needle
8: Needle Unit of Filament Guide
9: Mold for Cast Molding
9a: Slurry Inlet
9b: Slurry Casting Space
10: Lower Plate Member
10a: Protruding Portion
11: Filament

12: Absorption Container (Plaster Mold or Porous Resin Mold)
13a, 13b: Top and Bottom O-Ring Grooves
14a, 14b: O-Rings
15: Vacuum Suction Container
16: Filament Fixing Plate
17: Tension Guide
18: Nozzle Body
18a: Nozzle Member Installation Hole

The invention claimed is:

1. A method of manufacturing a nozzle member which has a plurality of through holes having a shape of a straight line parallel to a center axis, the method comprising:
   preparing a mixture by mixing raw material powder of ceramics, a binder for extrusion molding, and moisture;
   continuously passing two or more filaments in parallel and under tension through a back-tensioner comprising an elastic body or tension roller, a filament guide, and an orifice of an extrusion mold, the two or more filaments having a uniform diameter along overall length and formed of synthetic resin, carbon, or a metal;
   simultaneously with the continuous passing of the two or more filaments, continuously supplying the mixture with pressure into the orifice of the extrusion mold to obtain a continuous extrusion-molded body exiting from the orifice, the extrusion-molded body embedded with the two or more filaments in parallel;
   drying the continuous extrusion-molded body and cutting the dried continuous extrusion-molded body in a predetermined length to form a green body having the predetermined length;
   removing the two or more filaments from the green body to form two or more parallel and straight through-holes in the green body; and
   defatting and sintering the green body having the two or more parallel and straight through-holes.

2. A method of manufacturing a nozzle member which has a plurality of through holes having a shape of a straight line parallel to a center axis, the method comprising:
   preparing a slurry in which raw material powder of ceramics, water, and binder are mixed and dispersed;
   disposing two or more filaments in parallel inside a casting space of a mold while pulling the two or more filaments with a tension, wherein the two or more filaments have a uniform diameter along overall length and are formed of a metal and the mold includes an absorption container being installed inside a vacuum suction container by attaching O-rings to top and bottom O-ring grooves, the absorption container being formed of plaster or porous material;
   injecting the slurry into the casting space of the mold to form a cast molded body including the two or more filaments in parallel and under tension;
   drying the cast molded body to form a dried cast molded body; and
   removing the two or more filaments from the dried cast molded body to form a cast molded body including two or more parallel and straight through-holes; and
   defatting and sintering the cast molded body.

* * * * *